United States Patent [19]

Hirsekorn et al.

[11] Patent Number: 4,732,952

[45] Date of Patent: Mar. 22, 1988

[54] "B STAGEABLE" HIGH SERVICE TEMPERATURE EPOXY THERMOSETS

[75] Inventors: Frederick J. Hirsekorn, Delran, N.J.; William D. Emmons, Huntingdon Valley, Pa.

[73] Assignee: Rohm and Haas Company, Philadelphia, Pa.

[21] Appl. No.: 938,296

[22] Filed: Dec. 5, 1986

[51] Int. Cl.$^4$ ..................... C08G 59/06; C08G 59/18
[52] U.S. Cl. ..................................... 525/530; 525/531
[58] Field of Search ............................... 525/530, 531

[56] References Cited

U.S. PATENT DOCUMENTS

| | | | |
|---|---|---|---|
| 3,676,398 | 7/1972 | D'Alelio | 526/260 |
| 3,732,332 | 5/1973 | Curtis, Jr. et al. | 525/117 |
| 3,770,602 | 11/1973 | D'Alelio | 525/530 |

OTHER PUBLICATIONS

D'Alelio, "Esters of Polyepoxides with Polymerizing and Crosslinking Properties", *Chemical Abstracts*, vol. 81, No. 16, Abstract No. 92377b, 1974.
Nishibuko et al, "Hardenable Epoxy Compositions", *Chemical Abstracts*, vol. 82, No. 18, Abstract No. 113344b, 1975.
D'Alelio, "Esters of Polyepoxides with Polymerizing and Crosslinking Properties", *Chemical Abstracts*, vol. 85, No. 18, Abstract No. 124996d, 1976.

*Primary Examiner*—John C. Bleutge
*Assistant Examiner*—Robert E. L. Sellers, II
*Attorney, Agent, or Firm*—Marc S. Adler

[57] ABSTRACT

A B stageable thermosettable composition containing at least one polyepoxide and at least one linear anhydride monomer capable of forming a cyclopolymer in situ and processes for the formation of the B stage intermediate and final thermoset having a high service temperature is provided. The composition is useful in a two stage process; first to form a storage stable, flowable thermoplastic B stage intermediate by the free radical initiated vinyl polymerization of the linear anhydride in the liquid composition to a cyclic polymer and secondly to react the cyclic polymer with the poly epoxide to form a crosslinked high service temperature thermoset useful in the preparation of laminates, such as printed circuit boards, adhesives, and encapsulants.

9 Claims, No Drawings

"B STAGEABLE" HIGH SERVICE TEMPERATURE EPOXY THERMOSETS

FIELD OF THE INVENTION

This invention is directed to the use of a linear anhydride monomer, capable of forming a cyclopolymer, as a curing agent in a "B stageable" polyepoxide-containing thermosettable, preferrable liquid, composition useful for forming high service temperature thermosets. More particularly the invention is directed to a liquid composition, which is preferably solvent-free, containing a (meth)acrylic anhydride curing agent and at least one polyepoxide wherein the anhydride is first cyclopolymerized in situ without significantly crosslinking with the polyepoxide so to form a semi-solid or gel, flexible and flowable thermoplastic (B stage) that is stable upon storage at room temperature, and which can be subsequently cured at elevated temperatures, through the crosslinking reaction of the cycloanhydride polymer and polyepoxide, to form a high service temperature thermoset.

BACKGROUND OF THE INVENTION

Manufacturers of electronic circuitry and components desire thermosettable compositions to prepare laminates, such as printed circuit boards, adhesives, such as die-attach adhesives, and encapsulants having high service temperatures. "High service temperature" polyepoxide thermosets as used herein refers to three dimensionally crosslinked materials having a glass transition temperatures (Tg) on the order of at least 130° C., and preferably 180° C. or higher.

Liquid thermosettable compositions which can be partially polymerized or cured to form an intermediate solid, semi-solid, or gel thermoplastic that is stable and storable at room temperature in the semi-solid form, and easily handled and capable of being formed into desired end product configurations prior to the formation of a final cured thermoset are desired. These intermediate semi-solid materials are referred to herein as "B stage" materials; the liquid compositions that can be formed into such storage stable, but flowable thermoplastic intermediates are referred to as "B stageable" and processes for forming the intermediate are referred to as "B staging".

"Polyepoxides" as used herein refer to a polymer or polymer mixture wherein at least one polymer contains at least two epoxide,

Fuctional Groups. Conventional polyepoxide thermosettable compositions containing curing agents, optionally with accelerators, for the curing or crosslinking reaction of the polyepoxide with the curing agent are known and are capable of forming high service temperature thermosets. When curing agents that are non-reactive with polyepoxides at room temperature are employed in combination with accelerators, that do not initiate or catalyze the curing reaction at room temperature, the compositions can be stored in the liquid state for some time prior to curing. However, because of the rapid exothermic reaction of conventional curing agents with polyepoxides upon heating to elevated temperatures, it is often extremely difficult or impossible upon the application of heat to prevent the composition from rapidly proceeding from the liquid form directly to the final three-dimensionally crosslinked thermoset without forming a desirable B stage thermoplastic. Further, since the final service temperature of the thermoset is a direct function of the temperature employed for the curing reaction, it is often difficult or impossible to obtain a very high service temperature thermoset (Tg greater than 150° C.) because of the rapid onset of curing once the minimum elevated temperatures needed to initiate curing is reached. Complicating this situation is the fact that most liquid polyepoxide thermoset compositions are formulated in organic solvents. While the majority of the organic solvent used to formulate conventional polyepoxide thermosets volatilizes upon the application of elevated temperatures, some solvent can remain trapped in the thermoset resulting in a less than a 100% solid thermoset product having undesirable physical properties for certain applications. In addition, the presence of organic solvents in the liquid polyepoxide composition may present solvent removal, flammability and potential health problems.

DESCRIPTION OF THE PRIOR ART

Many acid anhydrides, having at least two acid groups per molecule, are known to be useful as curing agents for polyepoxides. Chapter 12 of *The Handbook of Epoxy Resins*, Lee and Neville, McGraw-Hill (1982) presents an excellent review of acid anhydride curing agents. The acid anhydrides which have been used as curing agents for polyepoxides include alicyclic anhydrides, aromatic anhydrides, chlorinated and brominated anhydrides, and some types of polymeric linear aliphatic anhydrides. Monomeric aliphatic anhydrides, however, have as a class been viewed as being unsuitable as polyepoxide curing agents since these anhydrides typically split to yield monofunctional carboxylic acid molecules. While each monocarboxylic acid molecule can react with a polyepoxide, monofunctional acids cannot react with polyepoxides to form the three dimensionally crosslinked network needed for a useful high service temperature thermoset. Certain linear polymeric anhydrides, such as those derived from the inter-molecular condensation of organic acids, can be used as polyepoxide curing agents since they are carboxyl-terminated polymers containing internal anhydrides, having the generalized structure HO[OC(CH$_2$)$_x$C00]H where n is at least 2, that provide the necessary difunctionality needed for the polyepoxide crosslinking reaction. Typical of these linear polymeric anhydrides useful with polyepoxides are polysebacic acid anhydride and polyazelaic acid anhydride. Linear polyanhydrides of the above type have also been employed as blends with certain monomeric anhydrides such as cycloaliphatic anhydrides, for example; hexahydrophthalic anhydride (HHPA), dodecylsuccinic anhydride (DDSA), an Nadic Methyl Anhydride ® (NMA), a trademark of Allied Chemical Corporation, and aromatic anhydrides such as phthalic anhydride.

Linear monomeric anhydrides which are capable of polymerizing in situ in polyepoxide liquid thermosettable compositions, such as (meth)acrylic acid anhydride, have not, however, been reported as being useful by themselves as curing agents for polyepoxides.

U.S. Pat. No. 3,676,398 is directed to polymerizable diester-derivative monomers which can undergo subsequent vinyl polymerization with itself or another vinyl monomer or polymer to form crosslinked infusible materials. This patent discloses the formation of the polymerizable diester-derivative monomer by the reaction of a polyepoxide with an acryloyl carboxylic acid anhydride. The acryloyl carboxylic acid anhydride is illustrated as being the reaction product of two different carboxylic acids; one of which can be methacrylic acid. These anhydride reaction products, however, are not disclosed or suggested as including (meth)acrylic acid anhydride monomer or a material containing a (meth)acrylic acid anhydride monomer.

Itaconic and maleic anhydride are also well known curing agents for polyepoxides (See U.S. Pat. No. 4,503,200), however, since they exist as cyclic structures in monomeric form they are not disclosed or suggested in the art as being capable of forming useful B stage intermediates. Applicant shall demonstrate hereinafter by actual comparative examples that such cyclic anhydride monomers are not suitable in the practice of the present invention.

Numerous references exist disclosing the use of alicylic anhydride-containing polymers of styrene and maleic anhydride as curing agents for polyepoxides. Examples of such references include U.S. Pat. Nos. 2,781,333, 2,858,323 and 2,848,433, 3,732,332 and Japan Kokai No. 81-92911. These polymeric anhydrides are incapable, however, of forming a stable B stage intermediate because of their reactivity with polyepoxides.

Russian Pat. No. 574,452 is related to the production of copolymers of (meth)acrylic esters and vinyl monomers. These copolymers are disclosed as being prepared by the free radical copolymerization of a vinyl monomer, specifically methyl methacrylate, with methacrylic acid anhydride and an epoxy compound, where the methacrylic acid anhydride and epoxy are present in an equimolar ratio. The patent teaches the formation of di/poly functional polymeric methacrylate. It is not, however, directed to a liquid B stageable thermoplastic or to a high service temperature polyepoxide thermoset. In addition, applicant's liquid polyepoxide composition does not require the need for methyl methacrylate or any other such monofunctional monomer in combination with the polyepoxide and (meth) acrylic anhydride curing agent to form the B stage or final thermoset.

It is an object of the invention to use a linear anhydride monomer which has the capability of homopolymerizing in situ in a composition, containing a polyepoxide without initially or significantly crosslinking with the polyepoxide, to form a B stage thermoplastic which is flexible, flowable, and stable upon storage, and which can be cured to form a high service temperature thermoset.

It is a further object of the invention to provide a solvent-free, B stageable thermosettable composition capable of yielding a high service temperature (100% solid) thermoset without the disadvantages of organic solvents.

It is an additional object of the present invention to provide a thermosettable B stageable composition which can be used in the fabrication of printed circuit boards, die-attach adhesives and encapsulants for electronic circuitry having a glass transition temperature higher than 150° C., preferably higher than 180° C. and most preferably higher than 225° C. These objects of the invention and others will become apparent from the following detailed description and illustrative examples which follow.

SUMMARY OF THE INVENTION

This invention is directed to a composition containing a polyepoxide and a linear anhydride monomer capable of forming a stable B stage thermoplastic intermediate and a high service temperature thermoset. It is also directed to processes for forming the B stage intermediate and high service temperature solid thermoset from the composition and processes for using the compositions for preparing laminates, adhesives encapsulants.

DETAILED DESCRIPTION OF THE INVENTION

The thermosettable composition of the present invention contains a polyepoxide and a linear anhydride monomer. The polyepoxide may be any epoxide polymer or mixture containing at least one epoxide polymer containing at least two epoxide,

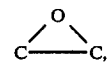

functional groups. The polyepoxide may be any such material known in the art and can be saturated or unsaturated, aliphatic, cycloaliphatic, heterocyclic, or aromatic. It may be also be substituted with various groups such as for example, halogens. One preferred class of polyepoxides useful in the practice of the invention are epoxidized esters having a least two epoxy groups such as for example; 2,3-epoxybutyl 3,4-epoxypentanoate, epoxycyclohexanol epoxycyclohexanoate (e.g. Union Carbide Corporation's ERL ® 4221) and the like. Another preferred class are bisphenol derivatives such as for example; epicholorohydrin- bisphenol adducts including Shell Epon ® 828, and bis-4,4$^1$-(2$^1$,3$^1$-epoxypropyl) dibromophenyl propane, such as for example Dow Chemical's Quatrex ® 6410, and the like. Other preferred polyepoxides include epoxycresol novolaks and epoxyphenol novolaks.

The linear anhydride monomers which can be used in the practice of the invention are selected from the group of linear anhydride monomers that can form a linear cyclopolymer by a free radical vinyl homopolymerization reaction in the presence of a polyepoxide without significant crosslinking therewith. The linear cyclopolymers so formed subsequently open during the curing or crosslinking reaction with the polyepoxide while maintaining their linear polymeric chain structure without degradation of the polymer backbone. For example, methacrylic anhydride monomer (MACAN) has the structural formula:

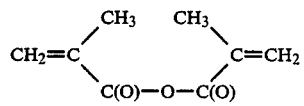

The MACAN monomer homopolymerizes by a free radical vinyl polymerization to form a linear cyclopolymer having the structural formula:

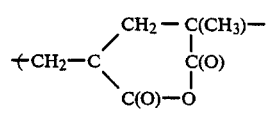

This linear cyclopolymer can open during the curing reaction with polyepoxides without losing its linear polymeric chain structure and without degradation of its molecular weight.

Polymeric (non) cyclicanhydrides formed from cyclic anhydride monomers such as polyazelaic anhydride polymer and copolymers are not contemplated within the class of linear anhydride monomer curing agents of the present invention, since such polymers do not have the capability of ring opening during cure while maintaining a rigid linear polymer chain without molecular weight degradation.

While MACAN is the preferred linear anhydride curing agent for use in the composition of the invention, acrylic anhydride (ACAN), mixtures of methacrylic acid anhydride and acrylic anhydride, and the like may also be employed.

It is preferred that the polyepoxides and monomeric linear anhydride curing agents used in the composition of the invention are liquids at room temperature or that they are capable of forming solutions or dispersions with one another at room temperature.

The molar ratio of monomeric linear anhydride curing agent to polyepoxide in the composition can vary from as low as about 0.4/1.0 to about 1.0/1.0. Preferably the molar ratio of monomeric linear anhydride to polyepoxide is in the range of about 0.6/1.0 to 1.0/1.0, and most preferably from about 0.8/1.0 to 1.0/1.0.

The amount of polyepoxide and monomeric linear anhydride in the composition is a function of the amount of additives, initiators, accelerators, fillers, pigments, mold lubricants, reinforcement agents and the like which can be added to the composition. It is preferred not to utilize any solvent in the composition for the reasons set forth hereinbefore.

In order to form a B stage intermediate it is necessary for free radicals to be present, or become present in the composition to initiate the vinyl homopolymerization of the linear monomeric anhydride to a linear cyclopolymer. Free radicals can be supplied from the composition itself without the addition of free radical generators or by the addition of free radical generating compounds to the composition. One mechanism for generating free radicals for B staging the composition without adding free radical generating compounds is by exposing the composition to short wavelength actinic radiation, such as for example electron beam radiation. Another less preferred mechanism is to subject the composition to an elevated temperature, on the order of from about 50° C. to about 80° C., but below the temperature required to initiate the polyepoxide-anhydride curing reaction, for an extended time. This mechanism is not preferred, however, because if the epoxide anhydride crosslinking reaction temperature were to be accidentally reached, the composition could proceed directly from the liquid, past a B stage, and directly to a solid thermoset. Heating the liquid composition to elevated temperatures below the critical temperature is also not a preferred means for forming the B stage intermediate because of the length of time needed to form a desirable B stage material. Another preferred mechanism for B staging the liquid composition is by the use of ultra-violet (UV) radiation exposure coupled with the addition of a photoinitiating free radical generating compound or mixture to the liquid composition. The photoinitiating compound or mixture should be selected such that the compound or mixture will generate a sufficient amount of free radicals for the vinyl cyclohomopolymerization reaction of the monomeric linear anhydride preferably at room temperature. Suitable photoinitiating compounds for room temperature UV exposure include azobis-isobutyronitrile and related azobisnitriles such as those of the E. I. DuPont de Nemours Vazo ® series. Other suitable UV photoinitiators include benzoin, alkoxy acetophenones, hydroxy alkyl - or hydroxy cycloalkyl aryl ketones, and the like. No special precautions or filtration of the light source is required for the UV exposure; conventional "black light" sources may be used. An additional preferred mechanism for B staging the composition involves the addition of free radical generating compounds which yield free radicals at temperatures higher than room temperature, but lower than the polyepoxide-anhydride curing temperature. These free radical generators are conventional materials well known to those of ordinary skill in the art including for example, benzoyl peroxide, t-butyl peracetate, azobis (isobutyronitrile), azobis (dimethylvaleronitrile); azobis (dimethylmethoxybutyronitrile) and the like. When free radical initiators are added to the composition typically they are added at a concentration of from about 0.1 to about 5.0 weight percent based on the weight of the anhydride monomer present in the composition. It is also possible, but not practical or preferred, to B stage the composition by the addition of free radical initiator which produce free radicals at room temperature, however, such initiators must be handled at temperatures below room temperature and accordingly are difficult to handle and control.

The composition is B staged until a semi-solid or gel having desired viscosity and other physical properties are achieved. After the composition is B staged to form a semi-solid or gel, it may be stored at room temperature in the gel state for a period of about 2 weeks or at depressed temperature, for example at about 40° F., for up to about 1 month. The B stage material is flexible and practical; it can be molded into the desired shape, applied to substrate surfaces and the like in preparation for final curing.

To cure the B stage material to a three dimensionally crosslinked thermoset, the B stage is then heated to a temperature of at least about 150° C., preferably to a temperature of 180° C. and in some cases to temperatures as high as about 250° C. for a sufficient time, usually on the order of several hours, to form the thermoset.

The time for the final curing reaction can be accelerated by the addition of conventional polyepoxide-anhydride accelerators to the starting liquid composition. These accelerators include for example tertiary amines such as; benzyldimethyl amine or 2,4,6,-tri(dimethyl amino)phenol; quaternary amines such as benzyl trimethyl ammonium chloride, phosphines such as triphenylphosphine, and other Lewis bases. A preferred accelerator for the composition has been found to be benzyltrimethylammonium chloride. When accelerators are added to the liquid composition, they are included in amounts conventional in the art, for example, at concentrations of from about 0.1 to about 5.0 percent by weight of the polyepoxide-anhydride composition.

The resultant thermoset is a 100% solid material having a service temperature as high as the final curing temperature.

As mentioned previously, various other ingredients may be mixed with the composition including fillers, pigments, dyes, mold lubricants, reinforcements and the like. It is preferred that no more than 80 weight percent of the composition contain such other ingredients. It is also preferred not to utilize, as a diluent, any monofunctional monomer in an amount greater than 20 weight percent since such monomers may have a negative effect on the tractability of the B stage and could severley reduce the service temperature of the final thermoset. Certain reinforcing agents such as glass, fiberglass, Kevlar ® E. I. DuPont, which is an aromatic polyamide, silica, mica, talc, calcium carbonate, mixtures thereof and the like may be used in various amounts to achieve desired thermoset physical properties for specific end uses. In preparing laminates, such as printed circuit boards, from the composition, the preferred additives are glass mat, Kevlar mat, woven glass cloth, non-woven glass strands or non-woven Kevlar strands, any of which being wettable by the composition.

The following examples are provided to illustrate the present invention, and are not intended to limit the scope of the invention. All amounts are by weight unless otherwise indicated.

EXAMPLE 1

A mixture of methacrylic anhydride (MACAN) (111 parts), epoxycyclohexyl epoxycyclohexanoate (Union Carbide Corporation ERL ® 4221) (120 parts), benzyltrimethylammonium chloride accelerator (BETAC) (1.2 parts), and 0.25 parts of (azobis(dimethylvaleronitrile)) initiator (E. I. duPont de Nemours, Inc.'s Vazo ® 52 brand) were mixed in the absence of water and in the presence of air. The mixture was then charged to a room temperature mold ($\frac{1}{8}''\times 4''\times 4''$) and the mold was then placed in an 80° C. oven. In about 1 hour the mold was observed and gelation to a "B"-stage resin had occurred. The gel was then removed from the mold and then further heated at 150° C. for four hours to accomplish final curing. The glass transition temperature (Tg) was then determined using a E. I. duPont Thermal Analyzer by the penetration probe method. No Tg was detected up to a temperature of 225° C.

EXAMPLE 2

Laminate Manufacture

A mixture of MACAN (64.5 parts), bis (epoxypropyldibromophenyl)propane Dow Chemical Company's Quatrex ® 6410 brand) (39 parts), ERL ® 4221 (46.5 parts), Vazo ® 52 free-radical initiator (0.51 parts) and benzyldimethylamine accelerator (BDMA) (1.5 parts) were mixed in air as in Example 1, and then degassed under vacuum. A glass fabric was impregnated with the mixture by dipping the mat at an acute angle to and into the liquid mixture forcing entrapped air from the fabric. The fabric was removed from the mixture and allowed to drain in air. The impregnated fabric was then heated at 50° C. until gelation had occurred (about 1 hour). The impregnated fabric was cut in several sections and stacked. The stacked fabric was then pressed in a hot press at 225° C. for four hours to produce a laminate. The resulting laminate had a Tg (as measured by the technique used in Example 1) of 225° C.

EXAMPLE 3(Comparative)

Casting

In this example, mixtures were made with various unsaturated anhydrides and examined for their casting and subsequent flow behavior. In Examples 3-E and 3-F, the amount of epoxy resin was reduced to maintain the epoxy/anhydride stoichiometry. Sample 3A represents the invention, the other samples are comparative.

| Sample | Anhydride | Epoxy Resin[a] | Initiator[b] | Accelerator[c] |
|---|---|---|---|---|
| 3-A | MACAN (5.5) | 5.0 | 0.22 | 0.11 |
| 3-B | Itaconic (10.0) | 13.0 | 0.65 | 0.235 |
| 3-C | Itaconic (10.0) | 14.0 | 0.65 | none |
| 3-D | Maleic (10.0) | 14.0 | 0.50 | 0.245 |
| 3-E | Styrene (9.0)/ Maleic (1.0) | 1.76 | 0.21 | 0.017 |
| 3-F | Styrene (6.0)/ Maleic (4.0) | 7.0 | 0.20 | 0.07 |

[a]ERL-4221
[b]Vazo 52
[c]benzyldimethylamine (BDMA)

The mixture of Example 3-B began to gel upon admixture of the BDMA. It was therefore unsuitable for B staging and was not studied further. The other samples were admixed as in Example 1.

Castings of the mixtures of Samples 3A, C, D, E, and F were prepared as in Example 1, except that the mold was heated overnight at 50° C. to assure completion of the B staging vinyl polymerization. Sample 3-E separated into two phases during this "B"-staging polymerization, making it unsuitable for further cure into a resin useful for encapsulation purposes.

The remaining "B"-stage samples were visually examined for the presence of undesirable voids and for flow behavior by heating the samples in a press at 250° C. to determine if the material flowed. These tests are a measure of the utility of the B stage for storage and further fabrication/curing.

The only sample which produced a useful B stage encapsulating product without voids and having the ability to flow when subjected to high temperatures, as would be encountered in commercial encapsulation applications, was sample 3-A of the invention.

The results are presented below in Table I.

TABLE I

| Sample | Appearance | Voids? | Flow? |
|---|---|---|---|
| 3-A | Clear | no | yes |
| 3-C | Clear | yes | no |
| 3-D | Clear | yes | no |
| 3-F | Clear | yes | no (a) |

(a) On heating to 175° C. overnight to complete cure, casting became very brittle and darkened.

EXAMPLE 4(Comparative)

Torsional Braid Analysis

Measurement of properties of prior Samples 3A, C-F coated onto glass braids were performed on an automated Torsional Braid Apparatus (TBA) sold by Plastics Analysis Instruments, Inc., Princeton, N.J. This apparatus, developed by J. K. Gilham, has been described in many publications; an excellent review of the technique and experimental technique used is found in a Chapter 5 of "*Developments in Polymer Characterisation 3*", ed. J. V. Dawkins, Applied Science Publishers, Ltd., Barking, Essex, England (1982).

Other portions of Samples 3A, and C-F, other than those used to prepare castings in example 3, were poured into the molds of Example 1 and a glass braid was coated with each sample. The coated glass braids were then inserted into the Torsional Braid Apparatus and each coated glass braid sample was heated from room temperature at a rate of 2° C./minute to 250° C.

Rigidity and log decrement was measured while cooling each of the samples from 250° C. to room temperature at 2° C./minute decrements. The curing behavior and rigidity as a function of cure and temperature, and final glass transition temperature was reported. Curing results from the TBA are tabulated below (Table II). A Tg of above 150° C. is a minimum target for many of the uses contemplated for this invention.

TABLE II

| Sample | Second-Stage Curing Seen in TBA Curve? | Tg, °C. of Final Product | Softening during temp. increments[a] |
|---|---|---|---|
| 3-A | Yes | 175 | Yes |
| 3-C | Yes | 170 | No |
| 3-D | Yes[b] | 75 | Yes |
| 3-E | Little/none | ca. 105 | Yes |
| 3-F | Yes | ca. 145 | Yes |

[a]Defined as a lower modulus (calculated from rigidity) with absence of thermoset properties in the temperature range ca. 100° C.–150° C. prior to final curing.
[b]Little increase in rigidity before reaching 100° C. Indicates lack of first-stage cure.

The TBA indicates that while sample 3A of the invention softened and flowed (confirming the casting behavior of example 3A) when heated from 100° C. to 150° C., it resulted in a solid thermoset having a Tg of about 175° C. Comparative examples 3D & 3E resulted in thermosets having insufficiently low Tgs (75° C. to 105° C.). Comparative example 3B while exhibiting a high service temperature did not soften upon heating indicating no adequate B stage formation. This result was consistent with casting behavior from example 3. Comparative example 3F exhibited a lower service temperature of about 145° C. and softened during temperature increments, but did not form a useful B stage material as exmplified in the casting experiment 3F.

EXAMPLE 5

Printed Circuit Board Mfg. UV Cure

Methacrylic anhydride (12 g), epoxycyclohexyl epoxycyclohexanoate (14.2 g), 1-hydroxycyclohexyl phenyl ketone photoinitiator (0.12 grams, commercially known as Darocur®) and benzyltriethylammonium chloride accelerator (BTEAC) (0.12 grams) were mixed. The molar ratio of MACAN to epoxy was 0.8 to 1. The resulting solution was degassed and used to impregnate a glass fabric. The impregnated glass fabric was placed in a nitrogen atmosphere under a "black light" as a source of ultraviolet light (1.47 mW/cm2). The solution gelled within 20 minutes at room temperature to form a prepreg which was then cut into sections, stacked, and heated at 250° C. in a laminating press to form a laminate with a Tg of about 225° C.

EXAMPLE 6

UV Photoinitiator Variance:

The composition of Example 5 was reformulated with changes in the the level and type of photoinitiator with the results shown in Table III.

TABLE III

| Initiator Trade Name/Chemical Name | Level (Wt. %) | TIME TO GEL (Minutes) | Tg °C. |
|---|---|---|---|
| Darocur/1-hydroxycyclohexylphenyl ketone | 1 | <20 | 225 |
| Darocur/1-hydroxycyclohexylphenyl ketone | 5 | <10 | 225 |
| Irgacure ®/dimethoxyphenyl acetophenone | 1 | <20 | 225 |
| Irgacure ®/dimethoxyphenyl acetophenone | 5 | <10 | 225 |
| 2,2-diethoxyacetophenone (DEAP) | 1 | <20 | 225 |
| 2,2-diethoxyacetophenone (DEAP) | 5 | <10 | 225 |

EXAMPLE 7

UV Exposure Variation

The conditions of Experiment 5 were repeated again, except that the intensity of the ultraviolet light was varied from 0.2 mW/cm2 to 22 mW/cm2 with no discernible effect on either the time to gelation or the Tg.

EXAMPLE 8

Molar Ratio Epoxide/Anhdride Variance

The molar ratios of epoxy/anhydride of Example 5 was varied to about 0.6 and about 1.0. The Tg of the resulting laminate was essentially unchanged over this compositional range.

EXAMPLE 9

Die Attach Adhesive

A die attach formulation viscous paste was prepared containing MACAN (25.5 g), ERL 4221 (31.7 g), Darocur (1.3 g), and BTEAC (1.3 g) mixed with zirconium silicate filler (TAM-51418) (145.5 g). The resulting viscous paste was degassed and gelled under UV light to form an adhesive solid. A small piece of the resulting adhesive solid was then placed on a heated (175° C.) ceramic substrate and a small silicon chip was placed, with gentle pressure, on top of the adhesive. After curing at 175° C. for at least 2 hours the resulting bond had a pull strength of about 8 kilograms using a Semiconductor Equipment Corporation, model 6000 Die Shear Tester.

We claim:

1. A B-stage thermosettable composition comprising a polyepoxide and a cyclopolymerized linear anhydride monomer, where said linear anhydride monomer cyclopolymerizes with itself in the presence of said polyepoxide without significant crosslinking with said polyepoxide to form the the thermoplastic B-stage composition which is stable upon storage at room temperature and which produces a high service temperature thermoset by the reaction of said cyclopolymerized anhydride with said polyepoxide upon curing, and where the molar ratio of said linear anhydride monomer to polyepoxide ranges from about 0.4/1 to 1/1.

2. The composition of claim 1 wherein said linear anhydride monomer is (meth)acrylic anhydride.

3. The composition of claim 1 further comprising an accelerator.

4. The composition of claim 3 where the accelerator is an aralkyltrialkyl quaternary ammonium halide.

5. The composition of claim 1 further comprising from about 0.1 to about 5.0 weight percent of a free radical initiator.

6. The composition of claim 1 where the polyepoxide is selected from the group consisting of epoxycyclohexyl epoxycyclohexanoate and bis(epoxyalkyl)-polyhalodiphenylalkane.

7. The composition of claim 1 where the molar ratio of noncyclic anhydride to polyepoxide is from about 0.6/1 to 1/1.

8. The composition of claim 1 further comprising less than about 80 weight percent reinforcing agents, fillers, or diluents.

9. The composition of claim 6 wherein the reinforcing agent is a glass or aromatic polyamide.

* * * * *